(12) United States Patent
Erman et al.

(10) Patent No.: US 8,565,718 B1
(45) Date of Patent: Oct. 22, 2013

(54) METHOD AND APPARATUS FOR CLASSIFYING MOBILE NETWORK USAGE PATTERNS

(75) Inventors: Bilgehan Erman, Marlboro, NJ (US); Vanita Katkar, White House Station, NJ (US); Zhengxue Zhao, Marlboro, NJ (US)

(73) Assignee: Alcatel Lucent, Paris (FR)

( * ) Notice: Subject to any disclaimer, the term of this patent is extended or adjusted under 35 U.S.C. 154(b) by 0 days.

(21) Appl. No.: 13/472,615

(22) Filed: May 16, 2012

(51) Int. Cl.
*H04M 11/00* (2006.01)

(52) U.S. Cl.
USPC ............... 455/405; 455/414.1; 455/432.3; 455/450

(58) Field of Classification Search
USPC ............... 455/405, 414.1, 432.3, 450
See application file for complete search history.

(56) References Cited

U.S. PATENT DOCUMENTS

2007/0060099 A1* 3/2007 Ramer et al. ............ 455/405
2012/0021753 A1* 1/2012 Damnjanovic et al. ..... 455/450

* cited by examiner

*Primary Examiner* — Nghi H Ly
(74) *Attorney, Agent, or Firm* — Harness, Dickey & Pierce

(57) ABSTRACT

In one embodiment, the method includes receiving, by a processor, subscriber usage data for a plurality of subscribers and performance metrics data for a plurality of cells of a wireless network. The method further includes identifying, by the processor, a set of subscribers that have one or more peak usage time intervals that are periodic. The method further includes identifying, by the processor, one or more peak usage time intervals of the plurality of cells in the wireless network. The method further includes classifying, by the processor, a first subset of the set of subscribers based on a correlation of the one or more peak usage time intervals of respective ones of the set of subscribers to the peak usage time intervals of the cell.

18 Claims, 4 Drawing Sheets

METHOD AND APPARATUS FOR CLASSIFYING MOBILE NETWORK USAGE PATTERNS

BACKGROUND

Mobile network operators (MNOs) are experiencing a rapid increase in mobile data traffic. This trend is caused by new data applications enabled by the increased processing power of mobile devices, and by the development and use of new mobile technologies. Subscribers, as a result, require ever-increasing bandwidth to take advantage of these applications, devices, and technologies.

In an effort to maintain network performance and to sustain a level of performance that has come to be expected by subscribers, some MNOs have begun monitoring and controlling network traffic and service usage by collecting real-time data concerning per-user, per-application, and per-device behavior. MNOs use this real-time data to offer different subscription tier levels with different bandwidth capabilities, or to give varying traffic priorities to different applications or users. MNOs may also assign different traffic priority levels to different users based upon their usage behavior (e.g., anticipated or expected) during times of network congestion. For example, emergency services personnel may be provided with a higher priority of service during periods of congestion as compared to users who are not associated with emergency services, who may have their priority of service downgraded.

SUMMARY

However, conventional traffic monitoring systems do not provide information on whether a particular usage pattern actually contributes to network congestion during peak usage intervals. Without this information, users or applications may be indiscriminately flagged for traffic-shaping during congestion, and as such their usage may be limited unnecessarily. This may degrade user experience and negatively affect user loyalty.

One or more embodiments relate to a method and/or apparatus for determining one or more of a high-value and/or high-cost subscriber of a wireless network, and/or a system for targeting offers and/or service restrictions to at least one subscriber of a wireless network system.

In one embodiment, the method includes receiving, by a processor, subscriber usage data for a plurality of subscribers and performance metrics data for a plurality of cells of a wireless network. The method further includes identifying, by the processor, a set of subscribers that have one or more peak usage time intervals that are periodic. The method further includes identifying, by the processor, one or more peak usage time intervals of the plurality of cells in the wireless network. The method further includes classifying, by the processor, a first subset of the set of subscribers based on a correlation of the one or more peak usage time intervals of respective ones of the set of subscribers to the peak usage time intervals of the cell.

In one embodiment, subscribers in the first subset are classified as high-value subscribers if the correlation for subscribers in the first subset is less than the correlation for subscribers of the set that are not in the first subset.

The method may further include offering service promotions to subscribers in the first subset.

The method may further include classifying a second subset of the set of subscribers as high-cost subscribers based on the correlation of the one or more peak usage time intervals of the respective ones of the set of subscribers to the peak usage time intervals of the cell.

In one embodiment, the correlation for subscribers in the second subset is greater than the correlation of subscribers of the set that are not in the second subset.

In one embodiment, subscribers in the second subset have peak usage time intervals that occur during peak usage time intervals of the cell.

The method may further include activating network resource control policies for subscribers in the second subset.

In one embodiment, the identifying determines periodicity of the peak usage time intervals of the plurality of subscribers by performing frequency domain analysis of usage data of the plurality of subscribers.

In one embodiment, the classifying is performed for each cell of the plurality of cells.

In one embodiment, an apparatus for classifying mobile network usage patterns includes a processor configured to receive subscriber usage data for a plurality of subscribers and performance metrics data for a plurality of cells of the wireless network that serve the corresponding subscribers. The apparatus may further includes a data collector and storage unit configured to collect and store data related to the subscriber service usage and performance metrics for a plurality of cells of the wireless network. The processor is configured to identify a set of subscribers that have one or more peak usage time intervals that are periodic on the cells that serve the corresponding subscribers. The processor is further configured to identify one or more peak usage time intervals for each cell in the plurality of the cells in the wireless network. The processor is further configured to classify a first subset of the set of subscribers based on a correlation of the one or more peak usage time intervals of respective ones of the set of subscribers to the peak usage time intervals of the cell.

In one embodiment, the processor is configured to classify subscribers in the first subset of the set of subscribers as high-value subscribers if the correlation for subscribers in the first subset is less than the correlation for subscribers of the set that are not in the first subset.

In one embodiment, the processor is further configured to offer service promotions to subscribers in the first subset.

In one embodiment, the processor is further configured to classify a second subset of the set of subscribers as high-cost subscribers based on the correlation of the one or more peak usage time intervals of the respective ones of the set of subscribers to the peak usage time intervals of the cell.

The processor may further be configured to activate network resource control policies for subscribers in the second subset.

The processor may determine periodicity of the peak usage time intervals of the plurality of subscribers by performing frequency domain analysis of the usage data of the plurality of subscribers. The processor may receive data related to at least one of a measurement of total airtime used by subscribers of the cell and number of connection setups completed by subscribers of the cell.

The processor may receive data related to at least one of a measurement of uplink data at each cell in the plurality of cells and a measurement of downlink data at each cell in the plurality of cells.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the present disclosure, and wherein.

DETAILED DESCRIPTION OF EXAMPLE EMBODIMENTS

Figure 1:
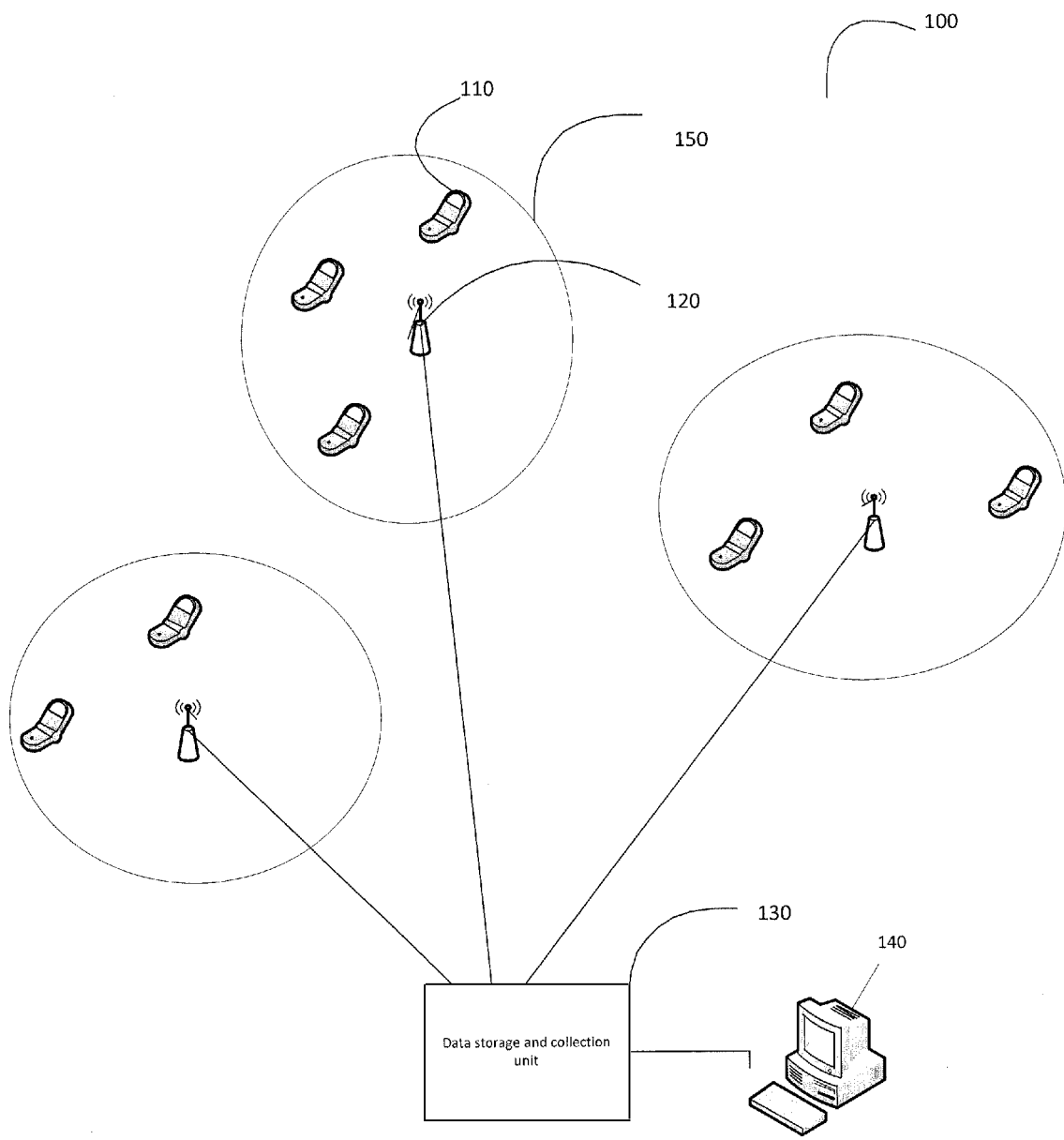
FIG. 1 illustrates a radio access network (RAN) and computing system in which example embodiments are implemented.

Various embodiments of the present disclosure will now be described more fully with reference to the accompanying drawings. Like elements on the drawings are labeled by like reference numerals.

Detailed illustrative embodiments are disclosed herein. However, specific structural and functional details disclosed herein are merely representative for purposes of describing example embodiments. This invention may, however, be embodied in many alternate forms and should not be construed as limited to only the embodiments set forth herein.

Accordingly, while example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected,' or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs), computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium" or "computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware, or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

Example embodiments may be utilized in conjunction with RANs such as: Universal Mobile Telecommunications System (UMTS); Global System for Mobile communications (GSM); Advance Mobile Phone Service (AMPS) system; the Narrowband AMPS system (NAMPS); the Total Access Communications System (TACS); the Personal Digital Cellular (PDC) system; the United States Digital Cellular (USDC) system; the code division multiple access (CDMA) system described in EIA/TIA IS-95; a High Rate Packet Data (HRPD) system, Worldwide Interoperability for Microwave Access (WiMAX); ultra mobile broadband (UMB); and $3^{rd}$ Generation Partnership Project Long Term Evolution (3GPP LTE).

FIG. 1 illustrates a portion of a RAN and computer systems 100 in which example embodiments are implemented.

Referring to FIG. 1, the system 100 includes a number of base stations 120, where each base station 120 serves a geographical area referred to as a cell 150. A base station 120 communicates with mobile stations 110 in the cell 150.

Mobile stations 110 may be equipment such as mobile telephones, portable computers, pocket computers, handheld computers, personal digital assistants (PDAs), car-mounted mobile devices, other IP-enabled devices, or the like, which communicate voice and/or data with the RAN. Throughout this disclosure, the term "users," "user equipments," "UEs," "mobiles," "mobile stations," "subscribers," etc. may be used interchangeably. At any given time, there may be zero, one, or several mobile stations 110 in any cell 150.

Referring still to FIG. 1, the base stations 120 are in communication with a data collector and storage unit 130 of a mobile network operator (MNO) and an analysis system 140. The base stations 120 communicate with the data collector and storage unit 130 through any known method. The analysis system 140 communicates with the data collector and storage unit 130 through any known method.

The base stations 120 provide subscriber 110 usage data and cell 150 traffic data to the data collector and storage unit 130. Subscriber 110 usage data may include, for example, user identifiers, cell identifiers, total airtime, etc. Cell 150 traffic data may include, for example, cell load measurements, total downlink data usage, and total uplink data usage.

The data collector and storage unit 130 stores the subscriber 110 usage data and cell 150 traffic data and provides this data as input to the analysis system 140. The analysis system 140 may provide input to other devices, computer programs, cloud-based systems, or other computer systems of the MNO such as, for example, report-generating systems or marketing systems.

In an example embodiment, the data collector and storage unit 130 may reside on the analysis system 140. In at least another example embodiment, the data collector and storage unit 130 may reside on a separate computer system from analysis system 140. The data collector and storage unit 130 may reside on the same premises as analysis system 140 or the data collector and storage unit 130 and analysis system 140 may reside on separate premises. In some example embodiments, the analysis system 140 may be a standalone device or it may be integrated in other computing systems of an MNO. The analysis system 140 may be implemented on one or more processors.

Figure 2:
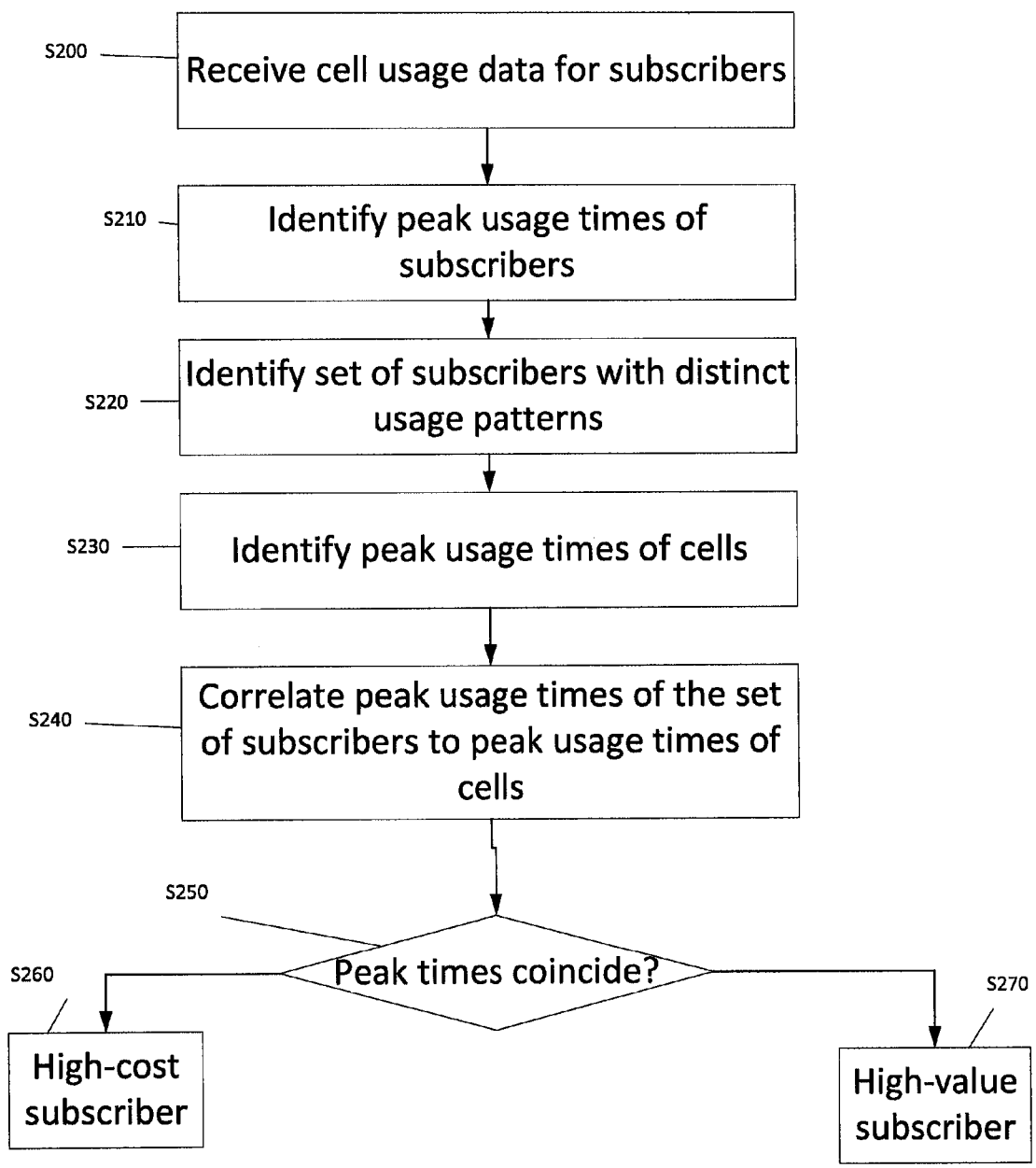
FIG. 2 illustrates a method of identifying a high-value subscriber of a RAN according to an embodiment.

FIG. 2 illustrates a method of identifying high-value subscribers according to an embodiment.

In step S200, the analysis system 140 receives, through any known method, data related to subscriber 110 service usage and performance metrics for cells 150 of the RAN from the data storage and collection unit 130. As described above, the data may include, for example, total airtime of subscribers 110, number of connection setups completed by subscribers 110, uplink data measurements, downlink data measurements, etc.

In step S210, the analysis system 140 identifies peak usage time intervals, or "personal busy hours," of subscribers 110. In example embodiments, one type of subscriber 110, for example a businessman, may have a personal busy hour before lunch and another personal busy hour in the afternoon. Another type of subscriber 110, for example a student, may exhibit a personal busy hour during his or her lunch break and another personal busy hour before going to sleep.

In an example embodiment, some performance metrics may represent attributes that have a greater effect on access network utilization than do attributes represented by other performance metrics. For example, the amount of downlink data may have a greater effect on access network utilization than the amount of uplink data. An example embodiment, therefore, may identify subscriber 110 peak usage time intervals, or personal busy hours, based only on performance metrics representing downlink data. It should be understood that the attributes that can be used to determine subscriber usage and network performance are not limited to the attributes named in the example embodiments. For example, other attributes that can be used to determine subscriber usage and network performance include the number of connection setups, uplink data measurements and the like.

In step S220, the analysis system 140 identifies the subscribers 110 that have a distinct usage pattern. The distinct usage pattern signifies periodicity where total usage over time for certain hours of the day will be notably different than the other hours of the day. The analysis system 140 performs this identification by examining time-series data representative of subscriber usage data. The time-series data may first have been subjected to data smoothing or trend removal by a data preprocessor (not shown or described herein) before analysis by the analysis system 140. The analysis system 140 transforms the time-series data into the frequency domain. In an embodiment, the analysis system 140 selects top-N samples (where N is a natural number), in the frequency domain, with the highest value of power spectrum density (PSD) in lower frequencies. These top-N samples represent the N subscribers with a more distinct usage pattern, relative to all other subscribers, according to the needs of the system. For example, an operator may desire to send offers to one-hundred (100) high value subscribers with a goal of offering/selling additional services and generating additional revenue/utilization of the network. In an example embodiment, therefore, the analysis system 140 will select the top one-hundred (100) samples with the highest power spectral density in lower frequencies, as described above, and the analysis system 140 will thereafter treat these one-hundred (100) subscribers as subscribers having the most distinct usage pattern relative all other subscribers.

Figure 3A:
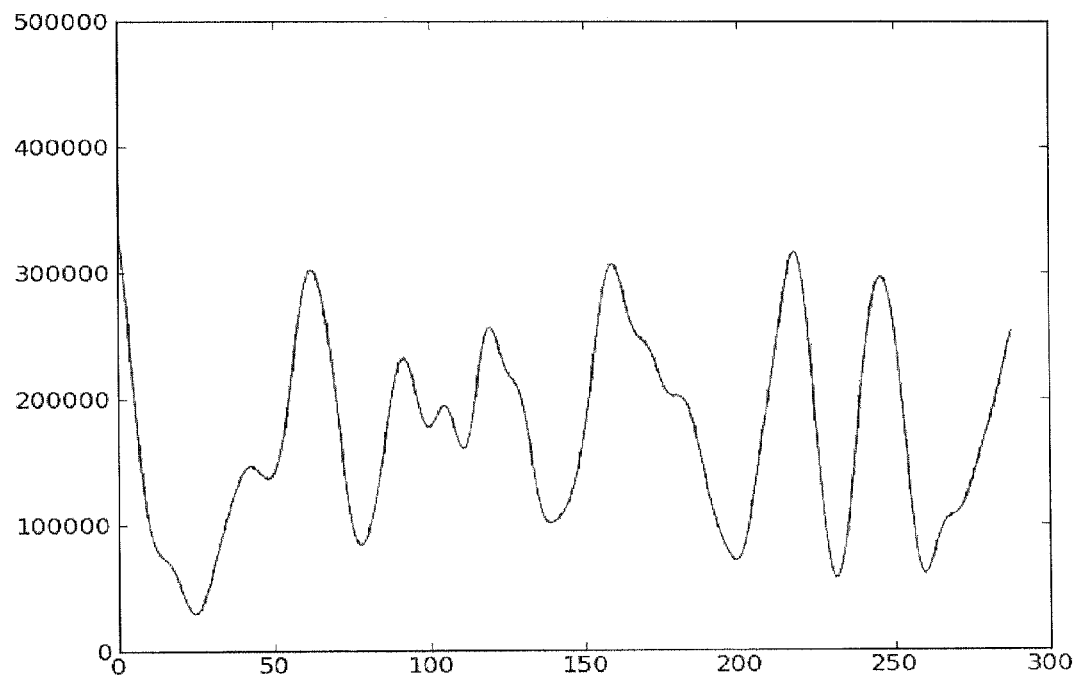
FIG. 3A illustrates a user exhibiting a high level of periodicity in peak usage time intervals.
Figure 3B:
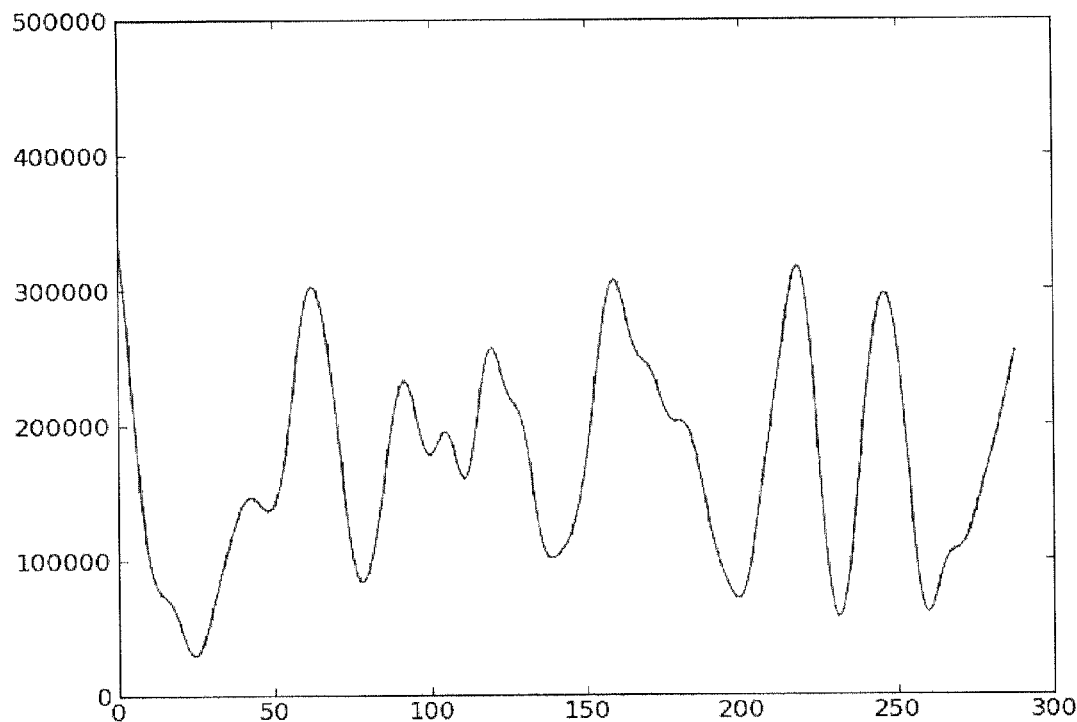
FIG. 3B illustrates a user exhibiting a low level of periodicity in peak usage time intervals.

FIGS. 3A and 3B depict examples of usage patterns of individual subscribers 110 over a 24-hour period. For ease of illustration, example usage patterns are shown in the time domain. However, as explained previously with regard to S220, it will be understood that the analysis system 140 transforms the data into the frequency domain before performing analysis according to example embodiments. The x-axis is time, expressed in units of 5 minutes, and the y-axis shows downlink data for the user in units of kilobytes per second. FIG. 3A depicts a first subscriber 110 with a distinct usage pattern. In other words and as illustrated, a periodicity can be seen in the peak usage time intervals for this subscriber 110. On the other hand, FIG. 3B depicts a user who shows no periodicity in peak usage patterns. For example, as illustrated this subscriber 110 may exhibit peak usage patterns at varying times with no discernible pattern of high usage.

Referring again to FIG. 2, in step S230, the analysis system 140 identifies the peak usage time interval of the cell 150 in the RAN. In step S240, the subscribers 110 that exhibit a high level of periodicity are further examined. The analysis system 140 correlates the peak usage times, or personal busy hours, of these subscribers to the peak usage times of the cells in the RAN. A subset of the set of subscribers 110 that exhibit a high level of periodicity are classified, by the analysis system 140 based on the correlation. Users who do not exhibit a high level of periodicity are not further examined. The correlation may be achieved by representing usage in, for example each hour of the day, for both the users and the cells, as a vector and calculating the coefficient-of-correlation between the usage vector of individual users with usage vector of cells. The values of the coefficient-of-correlation will range between 1 to −1, with 1 representing the highest positive correlation, 0 representing no correlation, and −1 representing the highest negative correlation. Then by picking top-N users that have highest positive and highest negative correlation, the analysis system 140 discerns a number of users who are not likely to contribute to the peak load of a cell, and a number of users who do contribute to the peak load of a cell, for further processing as described below.

In step S250, the analysis system 140 determines to what extent the personal busy hours of the subscribers 110 coincide with the peak usage times of the corresponding cells, using the values of coefficient-of correlation. If the personal busy hours of the subscriber 110 coincide with peak usage time of the cell, the subscriber 110 is classified as a high-cost subscriber in step S260. As described above, this can be determined by looking for the top-N subscribers having the highest positive correlation. Depending on the level of subscription (i.e., subscriber service plan (e.g., assigned priority level)), a high-cost subscriber may be targeted by the MNO for traffic shaping algorithms, network resource control policies, or other programs to maintain the quality of service experienced by all other subscribers.

If personal busy hours of the subscriber 110 do not coincide with peak usage times of the cell, the subscriber 110 is determined to be a high-value subscriber in step S270. As describe above, users with the top-N highest negative correlation will be determined to be high-value subscribers. A high-value subscriber, in example embodiments, may then receive promotions or offers to incentivize further use of the wireless network.

In example embodiments, periodicity of the peak usage time intervals of subscribers 110 may be determined using frequency domain analysis. For example, the analysis system 140 may utilize Fast Fourier Transforms (FFTs) to determine the periodicity of peak usage time intervals for subscriber 110.

Figure 4A:
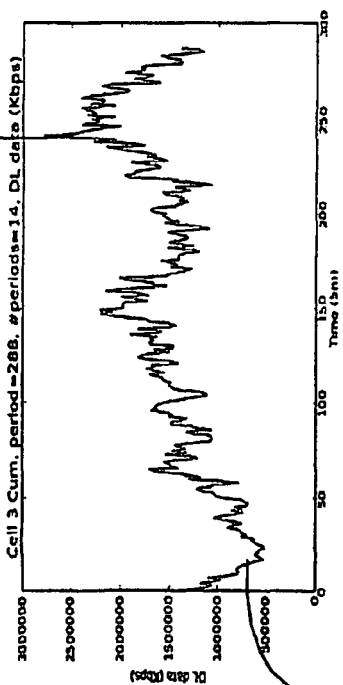
FIGS. 4A and 4B illustrate example peak usage time periods of a high-value subscriber and a high-cost subscriber.
Figure 4B:
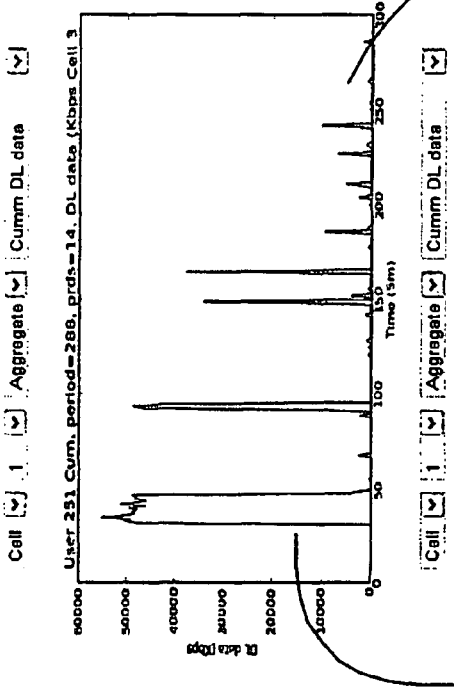

FIGS. 4A and 4B illustrate personal busy hours of a high-value subscriber 400 relative to cell usage according to example embodiments. For ease of illustration only, FIGS. 4A and 4B are illustrated in the time domain. FIG. 4A shows a peak usage pattern of a cell. FIG. 4B shows a high-value subscriber according to example embodiments. The high-value subscriber exhibits a peak usage period P1. However, this peak usage period P1 occurs during a low usage period P2 of the corresponding cell. On the other hand, during peak usage period P5 of the cell, the high-value subscriber exhibits a low level of usage P6.

Figure 5A:
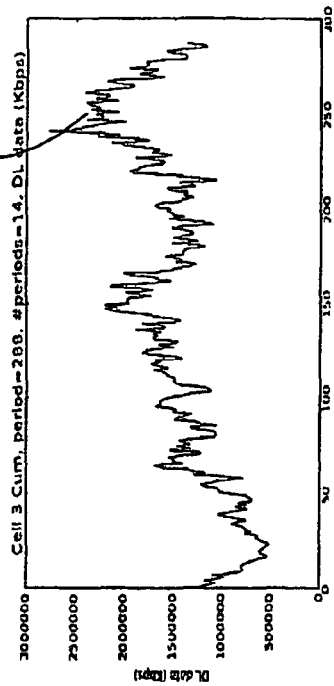
FIGS. 5A and 5B illustrate example peak usage time periods of a high-cost subscriber.
Figure 5B:
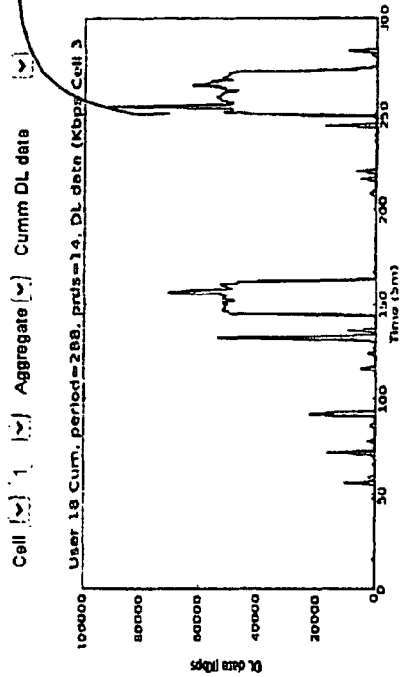

On the contrary, FIGS. 5A and 5B illustrate personal busy hours of a high-cost subscriber, relative to the same cell usage. As with FIGS. 4A and 4B, the illustrative example is depicted in the time domain. During periods of peak usage P4 of the corresponding cell, the high-cost subscriber also exhibits a peak usage period P3. The degree to which the personal busy hours of users overlap with the peak usage patterns of the cell are captured with the correlation algorithms executed by the analysis system 140 in the frequency domain, as described above with respect to step S240.

In example embodiments, a system for targeting offers to subscribers 110 is provided. The system for targeting offers may include a processor and an associated memory. The processor receives data related to subscriber service usage and performance metrics for the plurality of cells of the wireless network. Using this data, the processor identifies a set of subscribers. Each subscriber in this set has a periodic peak usage time. In other words, a periodic pattern may be discerned in these subscribers' peak usage times. The processor then further determines peak usage time intervals of the plurality of cells in the wireless network. A subscriber of the set of subscribers previously described may be classified as a high-value subscriber if the peak usage time intervals of the subscriber do not occur during peak usage time intervals of the cell. The processor may then offer service promotions to these high-value subscribers.

The system may also classify a subscriber as a high-cost subscriber if the peak usage time intervals of the subscriber occur during peak usage time intervals of the cell. The processor may activate network resource control policies for these high-cost subscribers. As already described above, the processor may perform frequency domain analysis, such as Fast Fourier Transforms, on the usage data of subscriber in order to determine the existence of periodicity within the usage data.

As a result, the embodiments provide a procedure for identifying high-value subscribers for mobile network operators. These high-value subscribers do not contribute to network congestion even though they exhibit a high level of usage of the mobile network. Further, example embodiments identify users who contribute to the access network overload. Example embodiments may provide lists of subscribers that may be output as a report or further provided as input for other computer systems of a mobile network operator.

Variations of the example embodiments are not to be regarded as a departure from the spirit and scope of the example embodiments, and all such variations as would be apparent to one skilled in the art are intended to be included within the scope of this disclosure.

What is claimed:
1. A method comprising:
receiving, by a processor, subscriber usage data for a plurality of subscribers and performance metrics data for a plurality of cells of a wireless network;
identifying, by the processor, a set of subscribers that have one or more peak usage time intervals that are periodic;
identifying, by the processor, one or more peak usage time intervals of the plurality of cells in the wireless network; and
classifying, by the processor, a first subset of the set of subscribers based on a correlation of the one or more peak usage time intervals of respective ones of the set of subscribers to the peak usage time intervals of the cell.

2. The method of claim 1, wherein subscribers in the first subset are classified as high-value subscribers if the correlation for subscribers in the first subset is less than the correlation for subscribers of the set that are not in the first subset.

3. The method of claim 2, further comprising:
offering service promotions to subscribers in the first subset.

4. The method of claim 1, further comprising:
classifying a second subset of the set of subscribers as high-cost subscribers based on the correlation of the one or more peak usage time intervals of the respective ones of the set of subscribers to the peak usage time intervals of the cell.

5. The method of claim 4, wherein the correlation for subscribers in the second subset is greater than the correlation of subscribers of the set that are not in the second subset.

6. The method of claim 5, wherein subscribers in the second subset have peak usage time intervals that occur during peak usage time intervals of the cell.

7. The method of claim 5, further comprising:
activating network resource control policies for subscribers in the second subset.

8. The method of claim 1 wherein the identifying the set of subscribers comprises:
determining periodicity of the peak usage time intervals of at least one of the plurality of subscribers by performing frequency domain analysis of usage data of at least one of the plurality of subscribers.

9. The method of claim 1, wherein the classifying is performed for each cell of the plurality of cells.

10. An apparatus comprising:
a processor and associated memory configured to receive subscriber usage data for a plurality of subscribers and performance metrics data for a plurality of cells of a wireless network that serve the corresponding subscribers; and
the processor configured to identify a set of subscribers that have one or more peak usage time intervals that are periodic on the cells that serve the corresponding subscribers,
the processor configured to identify, for each cell of the plurality of cells, one or more peak usage time intervals of the cell in the wireless network, and
the processor configured to classify a first subset of the set of subscribers based on a correlation of the one or more peak usage time intervals of respective ones of the set of subscribers to the peak usage time intervals of the cell.

11. The apparatus of claim 10, wherein subscribers in the first subset of the set of subscribers are classified as high-value subscribers if the correlation for subscribers in the first subset is less than the correlation for subscribers of the set that are not in the first subset.

12. The method of claim 11, wherein the processor is further configured to offer service promotions to subscribers in the first subset.

13. The apparatus of claim 10, wherein the processor is further configured to classify a second subset of the set of subscribers as high-cost subscribers based on the correlation of the one or more peak usage time intervals of the respective ones of the set of subscribers to the peak usage time intervals of the cell.

14. The apparatus of claim 13, wherein the correlation for subscribers in the second subset of the set of subscribers is greater than the correlation of the set of subscribers that are not in the second subset.

15. The apparatus of claim 14, wherein subscribers in the second subset of the set of subscribers have peak usage time intervals that occur during peak usage time intervals of the cell.

16. The apparatus of claim 10, wherein the processor is further configured to activate network resource control policies for subscribers in the second subset.

17. The apparatus of claim 10, wherein the processor determines periodicity of the peak usage time intervals of the plurality of subscribers by performing frequency domain analysis of the usage data of the plurality of subscribers.

18. The method of claim 10, wherein the classifying is performed for each cell of the plurality of cells.

* * * * *